Aug. 17, 1965   W. L. L. LENDERS   3,200,481
COMPONENT INSERTING MACHINE
Filed March 20, 1961   5 Sheets-Sheet 1

INVENTOR
WILHELMUS L.L. LENDERS.
BY
AGENT

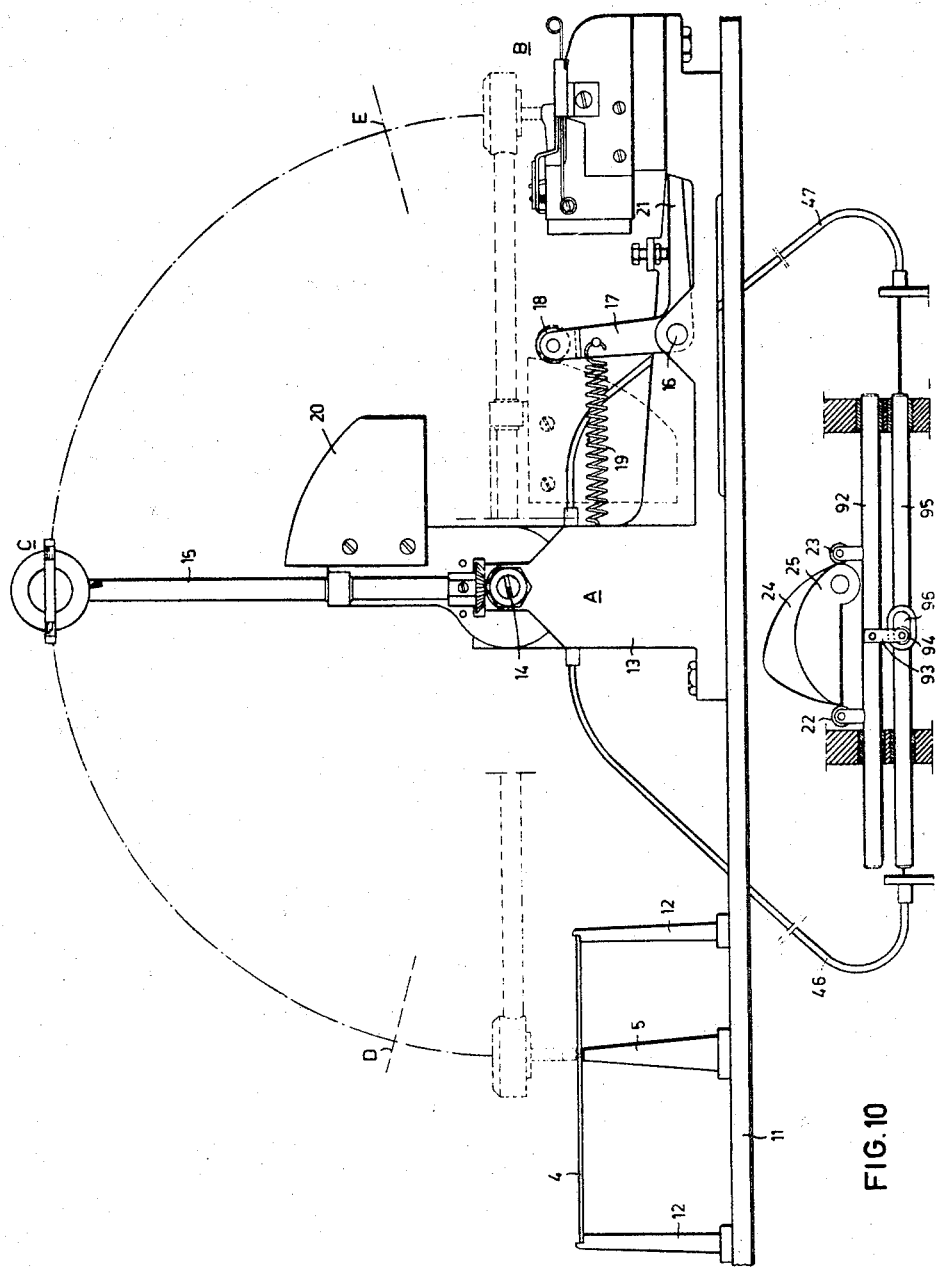

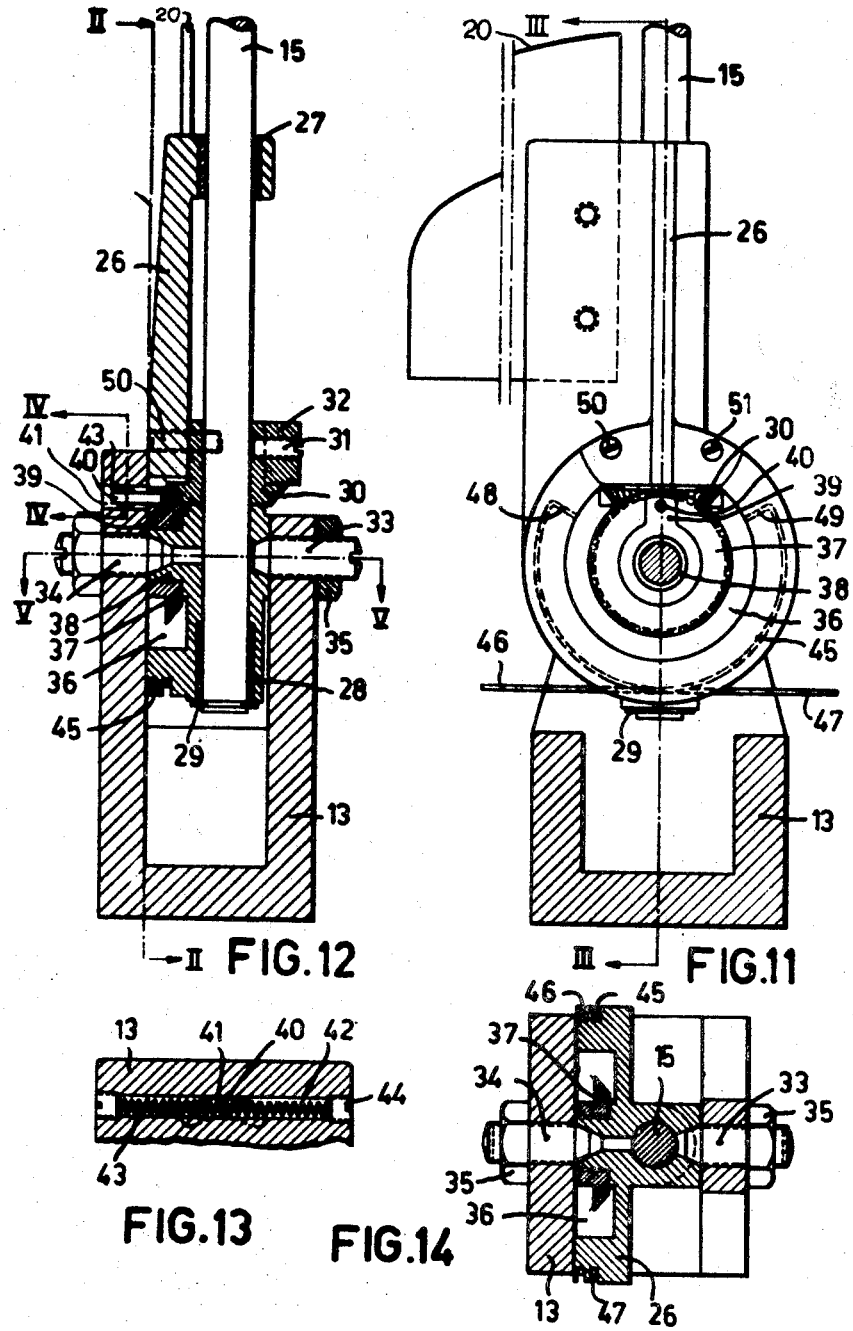

INVENTOR
WILHELMUS L.L LENDERS.

INVENTOR
WILHELMUS L.L. LENDERS.

3,200,481
COMPONENT INSERTING MACHINE

Wilhelmus Leonard Louis Lenders, Eindhoven, Netherlands, assignor to North American Philips Company, Inc., New York, N.Y., a corporation of Delaware
Filed Mar. 20, 1961, Ser. No. 97,012
Claims priority, application Netherlands, Mar. 24, 1960, 249,789
12 Claims. (Cl. 29—203)

It is known to fasten small, electrical parts such as resistors, capacitors, tube holders, bridge wires and the like to an apertured mounting plate, or printed circuit board by the use of inserting machines.

Known inserting machines are usually located above the mounting plate or circuit board and occupy so much space that it is not possible to use more than one machine above the board, and thus only one part at a time can be inserted. It is therefore necessary to provide a whole row of these machines for inserting a number of parts in a single mounting plate and each of these machines are comparatively costly.

This invention relates to a method and a device for carrying out this method, which permits simultaneously mounting a plurality of parts or components. In accordance with the invention a circuit board is arranged horizontally in a device comprising one or more arms, each of which is pivotable about a horizontal shaft, and each arm is provided, at its end remote from the pivotal point, having a head with means to grip the parts, which have conductors or extensions projecting parallel to each other. Each arm is pivoted so that it describes an arc of a circle in a vertical plane. It is thus possible to arrange a plurality of these arms around the mounting plate to simultaneously insert a plurality of parts, so that time and space are saved, and, moreover, the inserting machine itself may be of much simpler structure than heretofore.

The head may be rotatably arranged on the arm, so that the position of the parts to be fastened can be freely chosen, but with a view to the simplicity of the machine it is preferable, as in the illustrated embodiment of the invention, to secure the head rigidly to the arm and provide means for both pivoting the arm about a horizontal axis and rotating it about its longitudinal axis.

In a further embodiment of the invention the centre lines of the ends or extensions of the components are arranged so, when the parts are grasped, they cross the centre line of the arm at right angles or are normal to this centre line and also have a portion orientated downwards or aside, the arm or the head being turned, during the pivotal or arcuate movement of the arm, so that at the end of the arm movement the ends or extensions are facing the mounting plate, to which they are then substantially vertical. Thus the supply of parts to the inserting machine can be made in a simple manner.

In a further embodiment of the invention rotation of the arm or the head is accomplished in less time than required by the arm to describe the arc of the circle. Thus a correct position of the ends or extensions is ensured both at the beginning and at the end of the arc described by the arm.

The components can be fed to the device with extensions of the correct size and shape and ready for fastening. In a further embodiment of the invention it is also possible, however, to supply, in a horizontal position, components having long extensions projecting therefrom and to cut the ends or extensions to the desired dimension simultaneously with shaping and grasping of the component by the head. The components can therefore be fed in the conventional manner with the ends fastened on a tape, and preliminary preparation may be dispensed with.

Use may be made of a separately controlled feeder. However, it is simpler, in accordance with another embodiment of the invention, to feed the components in response to movement of the arm so they can be grasped by the head.

If the component consists solely of wire-shaped or strip-shaped material such as a bridge wire, its ends are deformed, in accordance with a further embodiment of the invention, so that the horizontal part of the wire or strip is looped upwardly between the center portion and the ends. Such a part can then be seized more easily and be held for fastening in the circuit board.

Two ends or extensions of a component to be inserted are preferably located, at the instant when the part is grasped by the head, in a plane parallel to the plane passing through the centre lines of the two apertures of the circuit board, in which these ends or extensions are to be inserted.

In one embodiment of the invention the pivoting arm is moved, prior to the grasping of the component, with a greater final velocity than for inserting the component in the circuit board, since the kinetic energy required for cutting and bending of the ends or extensions, if desired, should be greater than the energy required for fastening.

During insertion, the parts are not only to be inserted into the apertures of the mounting plate but preferably they are also to be fastened thereto, so that the detachment of the parts from the head does not require special precautions. In one embodiment of the invention anvils are arranged, underneath the apertures into which the ends or extensions are to be inserted and each end of extension is of such a length that it projects underneath the plate, while the mass of the head, the angular velocity of the pivoting arm and/or the torque of this arm are chosen so that the ends projecting underneath the plate during the fastening operation are bent over by the anvils and are urged against the bottom side of the plate. Then the parts can be held in the head solely by friction.

In another embodiment of the invention the component conductors or extensions may be deformed, prior to inserting in the circuit board, so that after the insertion they are clamped tight in the apertures. To this end the wires or extensions may, for example, be flattened or be reverse bent. As a further alternative, the ends or extensions, in accordance with a further embodiment of the invention, may be provided, prior to fastening in the circuit board, with known wedge-shaped pieces so that the component, after the insertion into the apertures, is clamped tight in the board.

A machine for arranging small electrical parts such as resistors, capacitors, tube holders, bridge wires and the like on an apertured circuit board, into which the components conductors or extensions are to be inserted, is characterized, in accordance with the invention, in that provision is made of a holder which may be of adjustable size, in which the mounting plate or circuit board can be accommodated.

In accordance with a further embodiment of the invention a machine intended for fastening components having long extensions in line with the body of the component is characterized in that the grasping portion of the head consists of two parallel members rigidly secured to the head and each provided over part of their inner sides with a cavity, of which one of the boundaries may be resilient, while on the outer side of each member a stop is provided.

In one embodiment of the invention the machine is characterized in that provision is made of two horizontal, spring-controlled knives, adapted to turn in a vertical sense about a fixed point and co-operating with the stops provided on the head member, the feeder member comprising two stationary, vertical supports, the component being adapted to move between the knife and the support so that the wire ends or extensions on either side of the parts to be inserted are cut to measure by the knives and bent over at right angles around the supports. This provides the possibility of supplying the parts in the conventional commercial packing, in which the extensions are fastened on either side in a tape.

In accordance with a further embodiment of the invention a feeder is provided, which is controlled by the pivotal movement of the arm so that a component is supplied before the head occupies the grasping position. In accordance with a further embodiment of the invention the pivotable arm is, to this end, provided with a lug, which may be adjustable, while provision is made of a two-armed lever in the feeder pivotable about a fixed point, of which one arm is arranged to co-operate with the lug, whereas the other arm controls the supply of the parts to be fastened.

For fastening parts having extensions or ends fastened in tapes, the machine in a further embodiment of the invention, is provided with guides for the tapes, while at the same time one or more stationary toothed guides engaging the extensions or ends are provided. The pitch of the guide teeth being equal to the distance between extensions in the tape, and one or more catches having two or more teeth which is also spaced at a distance equal to the said pitch, cooperating with the guide. The catches are moveable so that during movement towards the grasping position the tape is drawn along, while during a movement in the other direction, the tape is stationary.

If the device according to the invention is intended for fastening wires, these wires need not be held in tapes; in this case, in accordance with one embodiment of the invention, the feeder may be made in the form of a clamp operative in one direction, which is capable of supplying the wire from a supply reel to the desired position below the grasping member, while a clamp operative opposite the former prevents the wire from sliding backwards.

The grasping member may be constructed so that the components are mechanically held in the head and are released after fastening in the mounting plate. However, the head is simpler, when the components are held in the grasping member only by friction and in accordance with one embodiment of the invention provision is made of means to deform at least part of the bent-over ends or extensions so that they are clamped in the apertures into which they are to be inserted. This deformation may, for example, be formed by a flattened part or else the ends or extensions may be folded over part of their length. In accordance with one embodiment of the invention provision may be made of means to arrange wedge-shaped pieces about the bent-over wire ends or extensions.

In one embodiment of the invention the pivotal movement of the arm may be provided by two different cam discs so that the final speed of the head in the grasping direction differs from the final speed in the inserting direction.

In one embodiment of the invention the pivot point of the arm is provided with a conical gear wheel, which is connected with this point so as to perform a restricted movement in both directions of rotation, the central position being determined by two aligned, identical springs acting in opposite directions, while furthermore a cooperating gear wheel is rigidly secured to the arm, which is adapted to co-operate with the first-mentioned gear wheel.

In a further embodiment of the invention the arm is provided with a stop which limits the rotation of the arm about its longitudinal axis in both directions, the transmission ratio between the gear wheels being chosen so that the required rotation of the arm about its longitudinal axis in both directions is obtained prior to the end of the arcuate movement of the arm in both directions.

The invention will now be described with reference to a drawing, which shows embodiments of small electrical component parts and a presently preferred machine for arranging these parts on a mounting plate or circuit board in which:

FIG. 10 shows diagrammatically a side view of a device for fastening the parts shown in the preceding figures in a mounting plate, provided with printed wiring.

FIG. 11 is a sectional view of the part A of the device shown in FIG. 10 taken on the line II—II of FIG. 12, viewed in the direction of the arrow.

FIG. 12 is a sectional view of the device of FIG. 11 taken on the line III—III, viewed in the direction of the arrow.

FIG. 13 is a sectional view taken on the line IV—IV of FIG. 12.

FIG. 14 is a sectional view taken on the line V—V of FIG. 12.

Figure 1:
FIG. 1 shows an electrical resistor, of which the ends are held in a tape.
Figure 2:
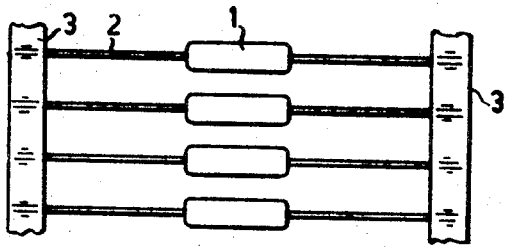
FIG. 2 is a plan view of FIG. 1.
Figure 3:
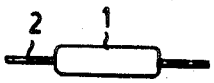
FIG. 3 shows an electrical resistor having conductors or extensions cut to measure.
Figure 4:
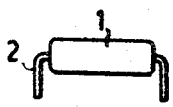
FIG. 4 shows the same resistor having bent-over extensions.
Figure 5:
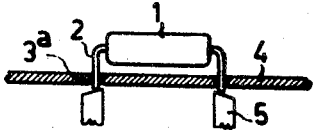
FIG. 5 shows the resistor in which the ends are inserted into the mounting plate.
Figure 6:
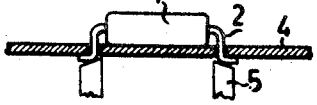
FIG. 6 shows the mounting plate with the resistor attached thereto.

Referring to FIGS. 1 and 2, reference numeral 1 designates a resistor having two conductors or extensions 2. These resistors are secured by their extensions in tapes 3. For fastening in the mounting plate the extensions 1 are first cut to a given length as is shown in FIG. 3 and then the extensions are bent over as is shown in FIG. 4. Then the bent-over extensions 2 are inserted into apertures 3 of a mounting plate 4, beneath which anvils 5 are arranged. When the horizontal parts of the extensions 2 are pressed down, the ends of these extensions are bent over as is illustrated in FIG. 6.

Figure 7:
FIG. 7 shows a bridge wire.
Figure 8:
FIG. 8 shows the bridge wire of FIG. 7, ready for mounting.

FIGS. 7 and 8 show a bridge wire 6, which is also to be fastened to the mounting plate 4. The bends 7 of such a bridge wire are provided, so that, on the one hand, fastening to the mounting plate is improved and on the other hand grasping and transporting of the deformed wire can be performed more effectively.

Figure 9:
FIG. 9 is a side view of a tube socket, in which a radio-tube can be arranged.

Finally FIG. 9 shows a tube socket 8 this part can also be fastened to the mounting plate by means of the device to be described hereinafter.

FIG. 10 is a side view of a device machine according to the invention by which the components shown in the preceding figures are grasped, after they have been cut to measure and bent over to be arranged and fastened on the mounting plate 4. On a foundation 11 are provided four horizontally adjustable supports 12, in which the mounting plate 4 is held. Underneath the mounting plate anvils 5 are arranged. On the foundation 11 provision is furthermore made of a machine consisting of a frame 13, which comprises two portions A and B, which will now be described more fully. The part A has a pivotal point 14, about which an arm 15, provided with a head C, is adapted to pivot. The two extreme positions of the arm 15 are indicated in broken lines. Provision is furthermore made of a pivotal point 16 in the frame 13, about which the two-armed lever or bell crank 17 is adapted to pivot. This lever 17 is provided at one end with a roller 18, which is urged by a spring 19 against a cam disc 20, which is connected with the arm 15. The other end 21 of the lever 17 co-operates in a manner to be described hereinafter with respect to the feeder B. The head C of the arm 15 grasps a part in the right-hand, horizontal position of the arm 15; the grasping movements involve the operations illustrated in FIGS. 3 and 4; then the head C, owing to the pivotal movement of the arm 15, moves into the extreme, horizontal, left hand position. This arm 15 then rotates simultaneously about its longitudinal axis so that the extensions pointing vertically downward in the right-hand position are also orientated vertically downward in the extreme left-hand position. The pivotal movement of the arm is produced by two cam discs 24 and 25, which are engaged by rollers 22 and 23, which transfer, by means of Bowden cables 46 and 47, movement to the arm 15. The roller 23 runs over a cam disc 25 and the roller 22 over the cam disc 24. These rollers are connected with each other by a rod 92; this rod has a pin 93, which supports a roller 94, which is adapted to move in a slot 96, provided in a rod 95. Both the rod 92 and the rod 95 are capable of performing only a linear movement. To the rod 95 are fastened Bowden cables 46 and 47.

The part A, shown in FIGS. 11, 12, 13 and 14, comprises a supporting body 26. This body has, on the top side, a sleeve 27, in which the arm 15 is rotatably supported. On the bottom side provision is made of a similar sleeve 28, on one side of which the arm is held by a clamping ring 29. On the other side, the arm 15 is provided with a conical gear wheel 30, which is secured to the arm by means of a set screw 31 and which has a cam 32. The pivotal point of the support is formed at one end by a pin 33, which is screwed into part of the frame 13, and at the other end by a pin 34, also screwed into the frame, the two pins being secured in place by nuts 35. In the support 26 provision is made of a chamber 36, in which a conical gear wheel 37 is arranged, which is adapted to turn about a collar 38 of the support 26 and which co-operates with the conical gear wheel 30. The conical gear wheel 37 has a nib 39, in which a pin 40 is fastened. This pin 40 is accommodated in a slot 41, which is located in the upright wall of the frame 13. Two springs 42 (FIG. 13) are located in an opening 43 in this wall, which opening is closed at either end by screws 44. The pin 40 is located between the biased springs 42. The support 26 has furthermore over the major part of its periphery two grooves 45 (FIG. 11), in which the two Bowden cables 46 and 47 are accommodated, which ends are secured in radial openings 48 and 49. The threaded pins 50 and 51 are screwed into the support 26 and project slightly from the inner side of this support; they serve as stops for the cam 32 on the conical gear wheel 30. On the support 26 is furthermore provided a cam 20.

Figure 15:
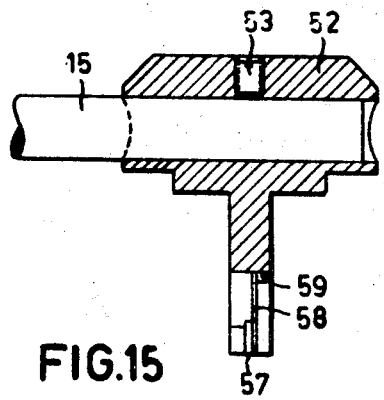
FIG. 15 is a sectional view of the part C of the device of FIG. 10, taken on the line VI—VI of FIG. 16.
Figure 16:
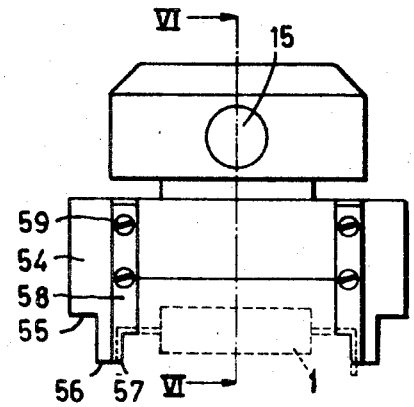
FIG. 16 is an elevation of the part C.

With reference to FIGS. 15 and 16 the portion C of FIG. 10 will be described hereinafter. This portion C consists of a comparatively heavy head 52, which is secured to the arm 15 by means of a screw 53. The head has two arms 54, each of which is provided at the end with two pressure surfaces 55 and 56. The inner side of each arm has a cavity 57, which is partly closed by a leaf spring 58. The springs 58 are secured to the head by screws 59.

Figure 17:
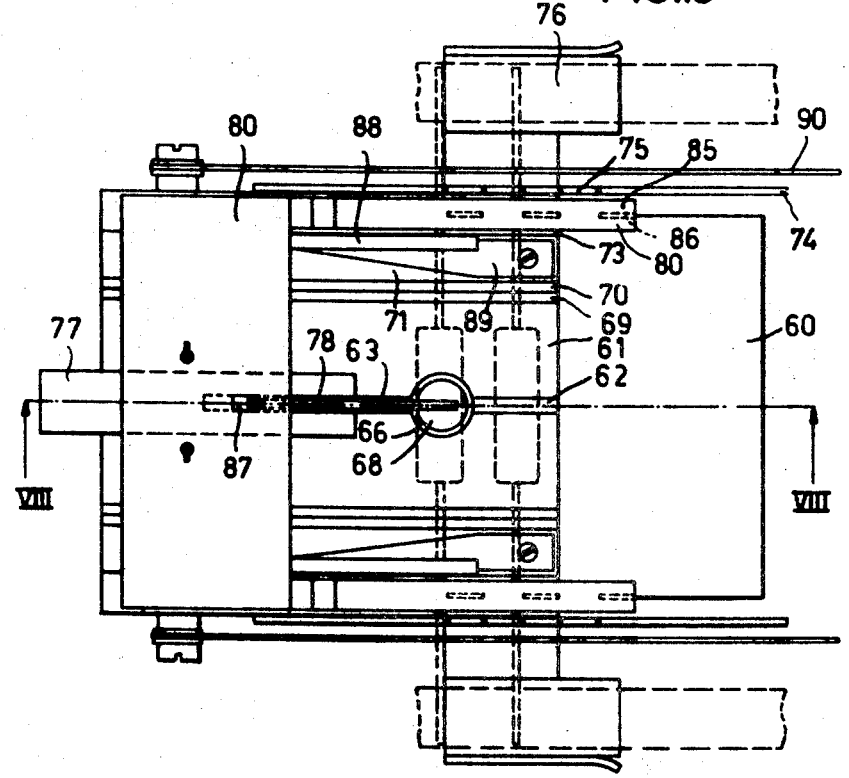
FIG. 17 is a plan view of the part B of FIG. 10.
Figure 18:
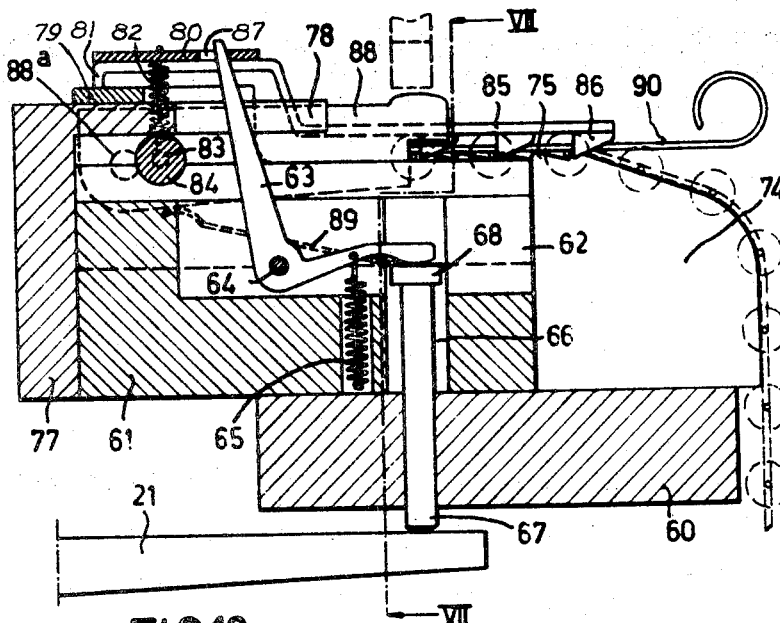
FIG. 18 is a sectional view of the part B taken on the line VII—VII of FIG. 17, viewed in the direction of the arrow.
Figure 19:
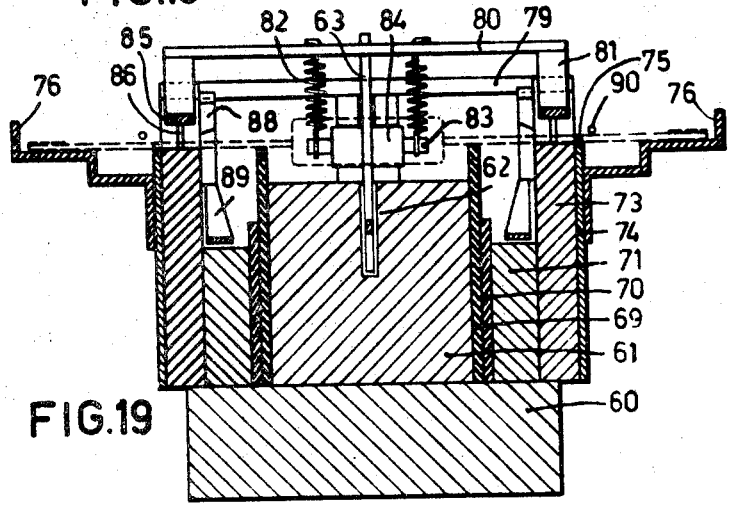
FIG. 19 is a sectional view of the part shown in FIG. 18, taken on the line VIII—VIII, also viewed in the direction of the arrow.

For the following description of the part B of FIG. 10 reference is made to FIGS. 17, 18 and 19. On a supporting plate 60 a body 61 is arranged. This body 61 has an elongated slot 62, in which is journalled a two-armed or right angled lever 63 so as to be pivotable about a pin 64. One of the arms of this lever 63 is biased by a spring 65, which is connected with the body 61. This body 61 has furthermore a bore 66, in which a pin 67 with a head 68 is adapted to move. The pin 67 bears on the arm 21 of the lever 17 and its head 68 bears against an arm of the lever 63. The body 61 is enclosed between two plates 69 (FIG. 19). These plates are sandwiched between two further plates 70, which are of lesser height than the plates 69 and on these plates 70 are provided two plates 71 of still lesser height. The assembly is enclosed between two side pieces 73, on which two plates 74 provided with teeth 75 are provided. Two step-like supports 76 are arranged one on each side of the side plates 74. An angular part 77 (FIGS. 17, 18) is secured to the body 61 and is provided at the top with a slot 78. In this slot one arm of the lever 63 is adapted to move, which arm projects above the slot 78. A cover plate 79 is arranged transversely on the assembly. On this cover plate 79 having a plate 80 by means of a bent-over rim 81. The plate 80 and the rim 81 are urged against the plate 79 by two springs 82, which are secured on each side of a shaft 83 of a roller 84. The plate 80 has two arms 85, which are provided with bevelled teeth 86, of which the pitch is equal to the distance between the ends of the resistors 1 of FIG. 2. One end of the lever 63 is located in an elongated opening 87 of the plate 80. Provision is furthermore made of two knives 88, which are rotatably connected at point 88a (FIG. 18) with the plates 73 and which are urged upwards by springs 89. Finally springs 90 are provided one on each side, rigidly secured to the plates 73 and projecting freely at the other end.

The operation of the assembly will now be explained with particular reference to FIG. 10. After a mounting plate 4 is arranged on the horizontally adjustable supports 12, a tape having resistors as shown in FIG. 2 is inserted into the part B. The tape arrives on the support 76 (FIGS. 17, 19). The extensions or conductors 2 are located and held between the teeth 75 and the teeth 86 (FIG. 18). The weak springs 90 urge the extensions downwardly so that they bear on the plates 74 and 69. It should be noted that the knives 88 are thus located above the extensions. It is furthermore assumed that the arm 15 has arrived almost at the end of the pivoting movement to the right, the grasping part of the head 52 pointing downwards. The head then arrives with a given kinetic energy at the feeder. The surfaces 55 of the head (FIGS. 15, 16) engage the knives 88 which are urged downwards against the action of the springs 89 and then slide along the sides of plates 73, which may be hardened. As a result the extensions are cut to a given dimension or length. Immediately thereafter the surface 56 of the head engages the extensions, which are bent over around the plates 69, so that the component has the shape shown in FIG. 4. The top part of the bent-over portion of each extension then lies in the recess 57 of the head and is held by the spring 58 engaging this portion. At this time cam disc 25 urges the roller 23 aside so that the pin 93 moves the rod 95, and the Bowden cable then commences movement of the support 26, as a result of which the arm 15 pivots to the left. For reasons to be explained hereinafter the pin 40 (FIG. 13) does not yet occupy its central position in the slot 41, but is located near one of the ends of this slot; one of the springs 42 is, consequently, stressed to a greater extent than the other. As a result, as soon as the pivotal movement of the arm starts, the pin 40 moves to its central position under the action of the stressed spring 42 and the toothed wheel 37 rotates. Thus the gear wheel 30 does not turn as the arm 15 starts its upward arc. The arm 15, to which this gear wheel is rigidly secured, does not turn relative to the arm either. However, as soon as the pin 40 is in the central position, the gear wheel 37 may now be considered as being stationary and the gear wheel 30 is now turned so that the arm 15 starts rotating about its longitudinal axis, together with the head 52, rigidly secured thereto. When the arm 15 is in a vertical position, the head 52 has turned through 90°. The transmission ratio between the conical gear wheels 37 and 30 is chosen so that in the position D (FIG. 10) the head has turned through 180°, i.e. completely upside down. A further turn of the arm 15 is no longer possible, since the cam 32 then engages the stop 50. During the last part of the pivotal movement of the arm 15 the conical gear wheel 37 is turned by the conical gear wheel 30; this is possible because the pin 40 moves in the slot 41 and thus stresses one of the springs 42. The shape of the cam disc, which has produced the pivotal movement of the arm 15, is chosen so that during the very last part of the pivotal movement the arm 15 is no longer driven. Thus the kinetic energy of the arm 15 together with the head 52 is such, owing to a correct choice of the weight of the head and of the final speed of the arm, that the head moves the part to be fastened into the apertures 3, the ends of the extensions striking the anvils 5; thus these ends are bent over, as is illustrated in FIG. 6 and the part is thus rigidly secured to the plate.

In order to permit the arm 15 to deflect resiliently backwards to a small extent after its stroke, the groove 96 (FIG. 10) is provided in the driving mechanism of the Bowden cables.

Soon after the start of the pivotal movement of the arm to the left as described above, the roller 18 (FIG. 10) is also allowed to move to the left owing to the shape of the cam 20 and the action of the spring 19. Thus as the arm 21 moves upwards, the pin 67 (FIG. 18) is urged upwards and the lever 63 turns about the point 64 against the action of the spring 65 (FIG. 18). Owing to the action of this lever 63 the plate 80 with the two arms 85 and associated teeth 86 are moved to the left, the roller 84 rolling underneath the bent-over part of the angular body 77. The springs 82 hold the plate 80 in place. The teeth 86 catch the component conductors secured in the tape at their extensions over such a distance that a component arrives at the correct place for cutting and bending of the extensions and for engagement by the head. This drive is possible, since the teeth 85 are bevelled in one direction. A reversal is prevented by these teeth 85 and movement is prevented by the springs 90.

As soon as the cam 24 sets the roller 22 moving, the second Bowden cable 47 drives the support 26 in the other direction, so that the pivotal movement of the arm 15 to the right begins. At the beginning of this sweep the arm 15 does not yet turn, since first the pin 40 of the conical gear wheel 37 must be pushed by the spring 42 into its central position in the slot 41; as soon as this has been accomplished, the conical gear wheel 37 can again be considered as being rigidly secured to the frame 13 and the rotation of the head about the axis of the arm begins. As arm 15 descends, the roller 18 is urged to the right by the cam 20 and the lever 21 turns about the point 16. As a result, the end 21 of this lever disengages the pin 67 and the lever 63 turns under the action of the spring 65 about the point 64. The plate 80 with the arms 85 is then moved to the right and the teeth 86 then slide over the component extensions. At the end of the stroke of the plate 80 a new resistor is ready for grasping the extensions lying between the teeth 75. In the meantime the arm 15 has arrived during its sweep at the position E (FIG. 10). The kinetic energy of this arm is then so high that the final speed of the head suffices to carry out the operations described above. After the position E of the arm has been occupied, in which position rotation of the arm by virtue of gear 30 has already finished, since the stops 32 and 50 engage one another, the head therefore occupies the correct position for cutting, bending and grasping.

If bridge wires as shown in FIG. 7 are to be secured to the mounting plate, they may be also supplied to the device by means of a tape. It will be obvious, however, that the ends of such a bridge wire cannot be bent as illustrated in FIG. 4 for a resistor, since the wire cannot be laid flat on the mounting plate, for the gripping members prevent such a disposition on the mounting plate. Therefore, such a bridge wire is preferably bent over as is shown in FIG. 8 and this is rendered possible by a different shape of the plates 69. However, it is not necessary to feed the bridge wires held in a tape. A wire emanating from a reel can be inserted in a simple manner into the feeder, provision being made, in known manner, of two clamps acting in opposite directions so that one clamp urges the wire against a stop and the other clamp prevents the wire from moving backwards. Cutting and bending over of the ends may take place in the manner described above.

As a matter of course, it is also possible to feed the parts in the shape shown in FIG. 4; in this case cutting and bending over of the extensions is no longer required. The same applies to the case in which, for example, tube sockets 9 are to be fastened. They are preferably supplied fastened in strips as described in Patent No. 3,015,796; they are grasped by a suitably constructed gripper, the strip being at the same time cut off.

Particularly in fastening parts such as tube sockets of FIG. 9 it is advisable to supply these sockets with the extensions turned upwards. The supply may then take place while the arm occupies the extreme right-hand, horizontal position, the sockets being supplied one by one not underneath the head but above the head. They may be held, for example, by vacuum in the head, so that turning of the head is no longer required, since the extensions, after the sweep of the arm, occupy the correct position.

Vacuum may also be used for holding other parts.

Figure 20:
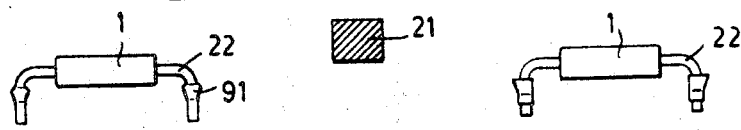
FIG. 20 shows a resistor of which the ends are deformed, subsequent to bending over
Figure 21:
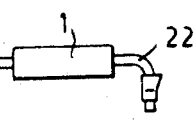
FIG. 21 shows the same resistor of which the ends are however provided with wedge-shaped parts.

After cutting and bending the extensions or ends of the parts, these extensions or ends may be deformed by simple means, as is illustrated by way of example in FIG. 20, where the two extensions are flattened, which is designated at 91. The anvils 5 underneath the mounting plate are no longer necessary, since the extensions, after insertion, are jammed in the aperture 3. This may also be achieved by folding over each end of the extension. A different method of fastening is illustrated in FIG. 21, where the two ends are provided, prior to or after cutting and bending over, with wedge-shaped pieces. Use is preferably made of wedge-shaped parts as described in patent application Serial No. 23,951; now Patent No. 3,133,774.

In practice it has been found that the force required for cutting and bending of the extensions is to be, in general, greater than the force required for inserting and fastening of the components in the board. This can be accomplished by a suitable choice of the shape of the cam disc 24, 25 so that the final speed of the arm is higher in one direction than in the other. For fastening of given parts requiring a higher amount of energy both in shaping and in fastening the mass of the head may be varied.

The mounting plate 4 is preferably in the form of a plate having printed wiring, which is situated on the bottom side of the plate. After the parts are fastened, a satisfactory electric connection can then be obtained by a known dipping method in a bath containing molten solder.

One of the major advantages according to the invention consists in that, in contrast to known insertion machines, a machine with a plurality of the arms and heads described can be arranged around the mounting plate and fasten simultaneously for example ten or more parts. The operation of the machine is restricted to the spatial position of the plates. That is, that a resistor as is shown in FIG. 1 must preferably lie parallel to the board or plate in which it is to be inserted and fastened. To this end the part B may be adjustably arranged in the frame 13 so it can occupy a plane parallel with the board and the gripping part of the head 52 may also be adjustable in this head so that these components are normal to the plane of the board. However, this parallel position is not necessary; as an alternative, the head may be moved in addition to being pivoted and turned, so that the correct final position of the part is obtained. A further advantage of the device described resides in its simplicity as compared with the known insertion machines. If in the known machines a disturbance occurs, the repair of this disturbance is usually costly in time and effort. With the device described repairs can be rapidly and simply made.

What is claimed is:

1. An inserting machine comprising a frame, means on said frame for receiving an apertured plate member, means on said frame for holding component parts having parallel extensions, at least one arm member pivotly secured on said frame at one end, the other end of said arm being moveable in an arcuate path between said apertured plate and said holding means, a head member attached to said other end of said arm for grasping a component held by said holding means and inserting said component in said apertured plate, means for driving said arm between said holding means and said apertured plate and separate means for driving said arm in the reverse direction, said separate means driving said arm at a greater velocity than said first named driving means.

2. An inserting machine according to claim 1 wherein said head member comprises a portion for fastening said head member on said arm, a pair of parallel arms including a spring member connected to each arm defining a cavity for receiving component extensions and shoulder means on said arms defining a stop.

3. An inserting machine according to claim 1 wherein said means for holding components to be grasped by said head member includes; means for feeding components into position relative to said head member, means operable in response to movement of said arm for operating said means for feeding components, a pair of knives resiliently supported for pivotal movement in response to contact with said head member for cutting component extensions to a determined length, and means for deforming said extensions for insertion into said apertured plate.

4. An inserting machine comprising a frame, means on said frame for receiving an apertured plate member, means on said frame opposite said first named means for feeding components having axial extensions to said machine, at least one arm member pivotly secured on said frame at one end, the other end of said arm being moveable in an arcuate path between said apertured plate and said feeder means, a head member having parallel arms extending normal to the axis of said pivotal arm attached to the other end of said pivotal arm for grasping a component in said feeder means and inserting said component in said apertured plate, means for turning said head about said longitudinal axis in response to movement of said pivotal arm, means for driving said pivotal arm over at least a part of said arcuate path from said feeder means to said apertured plate and separate means for driving said pivotal arm over at least a part of said arcuate path from said apertured plate to said feeder means, and means operable in response to movement of said pivotal arm adjacent said feeder means for actuating said feeder means.

5. An inserting machine according to claim 4 wherein said means for feeding components to said machine comprises a body member, flexible toothed guiding means for holding said component extensions within said feeder means, toothed catch means mounted in said body member for reciprocal movement for moving components into grasping position within said feeder means, a lever pivotally mounted in said body member for reciprocating said catch means, and said means for actuating said feeder means comprising a cam mounted on said pivotal arm, a pivotal right angled lever engaged by said cam for rocking said angled lever, and said angled lever being operatively connected with said first named lever for reciprocating said catch means.

6. An inserting machine according to claim 5 wherein said means for feeding said components to said machine includes within said body member, a pair of knives pivotally supported on said body member for cutting component extensions to a desired length, said knives being operable by engagement thereof by said head member, and means on said body member operative with said head member for deforming previously cut component extensions for insertion into said apertured plate.

7. An inserting machine comprising supporting means including a frame, first means on said frame for receiving and positioning a printed circuit board, second means on said frame for positioning and holding components supplied to said machine, means including an arm having an inserting head connected thereto at one end, means pivotally supporting said arm at its other end for movement of said inserting head over an uniterrupted arcuate path, one end of said path terminating at said first means and the other eind of said path terminating at said second means, means connected with said head member for picking up a component in said holding means and disengageable from said component inserted in said circuit board, and means for turning said head member about the longitudinal axis of said arm for orienting said component for insertion into said circuit board.

8. An inserting machine according to claim 7 wherein said head is rigidly attached to said arm, said means for rotating said head comprising said arm, and means for rotating said arm about its longitudinal axis.

9. An inserting machine according to claim 7 wherein said head is rigidly attached to said arm, said means for rotating said head comprising said arm, and means for rotating said arm about its longitudinal axis.

10. An inserting machine according to claim 9 said means for rotating said arm comprises a conical gear which is secured concentrically with said arm and connected to a second conical gear wheel normal thereto, and means connected with said second conical gear wheel for restricting its movement in both directions of rotation including axially aligned opposed spring means mounted on said frame member and operatively connected with said second gear wheel.

11. An inserting machine according to claim 9 wherein said means for rotating said arm comprises a conical gear which is secured concentrically with said arm and connected to a second conical gear wheel normal thereto, and means connected with said second conical gear wheel for restricting its movement in both directions of rotation including axially aligned opposed spring means mounted on said frame member and operatively connected with said second gear wheel.

12. An inserting machine comprising a support including a frame, means on said frame for receiving an apertured plate member, means on said frame for holding component parts having parallel extensions, at least one arm member pivotally secured on said frame at one end, the other end of said arm being movable in an arcuate path between said apertured plate and said holding means, a head member attached to said other end of said arm for grasping a component held by said holding means and inserting said component in said apertured plate, means for driving said arm between said holding means and said apertured plate and separate means for driving said arm in the reverse direction, said separate means driving said arm at a greater velocity than said first named driving means.

References Cited by the Examiner

UNITED STATES PATENTS

| | | | |
|---|---|---|---|
| 2,530,312 | 11/50 | Nasmith | 1—384 |
| 2,809,373 | 10/57 | Snyder | 1—322 |
| 2,829,371 | 4/58 | Sittner et al. | 1—91 |
| 2,914,843 | 12/59 | Petersen | 29—211 X |
| 3,028,108 | 4/62 | Bos et al. | 29—155.5 X |

WHITMORE A. WILTZ, *Primary Examiner.*
JOHN F. CAMPBELL, *Examiner.*